United States Patent [19]

Berry

[11] 4,244,545
[45] Jan. 13, 1981

[54] CABLE TRAY CONDUIT CLAMP

[75] Inventor: Richard C. Berry, North Camillus, N.Y.

[73] Assignee: Crouse-Hinds Company, Syracuse, N.Y.

[21] Appl. No.: 22,002

[22] Filed: Mar. 19, 1979

[51] Int. Cl.³ .................................................. F16L 3/24
[52] U.S. Cl. ...................................... 248/72; 248/228; 248/229
[58] Field of Search ................ 248/70, 72, 226.4, 227, 248/228, 229; 24/81 WH

[56] References Cited

U.S. PATENT DOCUMENTS

| | | | |
|---|---|---|---|
| 763,987 | 7/1904 | Kriebel | 248/70 |
| 768,819 | 8/1904 | Palmer | 248/72 |
| 1,199,326 | 9/1916 | Weil | 248/226.1 |
| 1,737,214 | 11/1929 | Brown | 248/72 |
| 1,840,216 | 1/1932 | Tormo | 248/72 |
| 1,877,781 | 9/1932 | Akerlund | 248/72 |
| 1,888,342 | 11/1932 | Anderson | 248/72 X |
| 2,282,310 | 5/1942 | Dunn | 24/81 WH |
| 2,376,041 | 5/1945 | Ellerthorpe | 248/72 |
| 2,726,836 | 12/1955 | Dickson | 248/228 X |
| 2,875,969 | 3/1959 | Thompson | 248/72 |
| 2,901,199 | 8/1959 | Thompson | 248/72 |
| 3,228,639 | 1/1966 | Korns | 248/62 |
| 3,572,623 | 3/1971 | Lapp | 248/72 |
| 3,604,676 | 9/1971 | Weber | 248/68 R |

FOREIGN PATENT DOCUMENTS

| | | | |
|---|---|---|---|
| 988927 | 4/1965 | United Kingdom | 248/226.4 |
| 1039646 | 8/1966 | United Kingdom | 248/72 |

Primary Examiner—J. Franklin Foss
Attorney, Agent, or Firm—Sughrue, Rothwell, Mion, Zinn & Macpeak

[57] ABSTRACT

A cable tray conduit clamp is comprised of a single one-piece body having a 90° sector plate, a square block protruding from one surface thereof with two sides in alignment with the radii of said sector plate and a bevelled boss protruding from the opposite surface of said plate with two sides thereof disposed in alignment with the radii of said sector plate. The extent of said block along the radii of said plate is substantially greater than the extent of said boss along said radii of said plate while the radial extent of said sector plate is substantially greater than the radial extent of said block. A pair of perpendicular intersecting bores are formed through the block and continue outwardly to the curved periphery of the sector plate as open channels in the surface of the plate from which the block protrudes. A J-shaped bolt having a sleeve nut threaded thereon is secured in one of the channels for clamping the body to a flange cable tray. A third bore extends orthogonally to said two intersecting bores through the block, plate and boss and a second J-shaped bolt extends therethrough for clamping various size conduits to the other surface of said plate against the bevelled boss.

6 Claims, 3 Drawing Figures

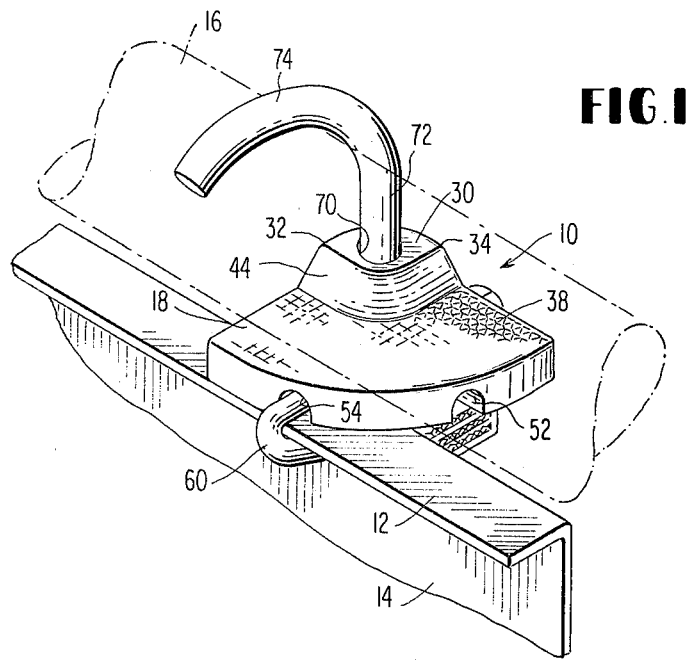
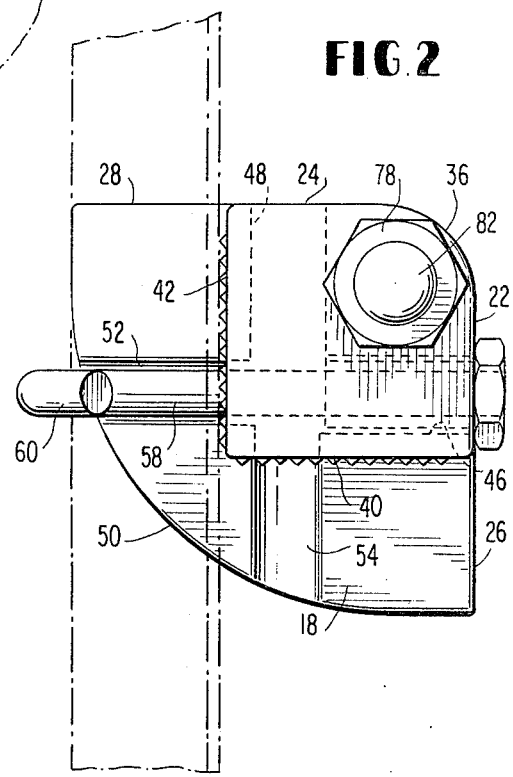
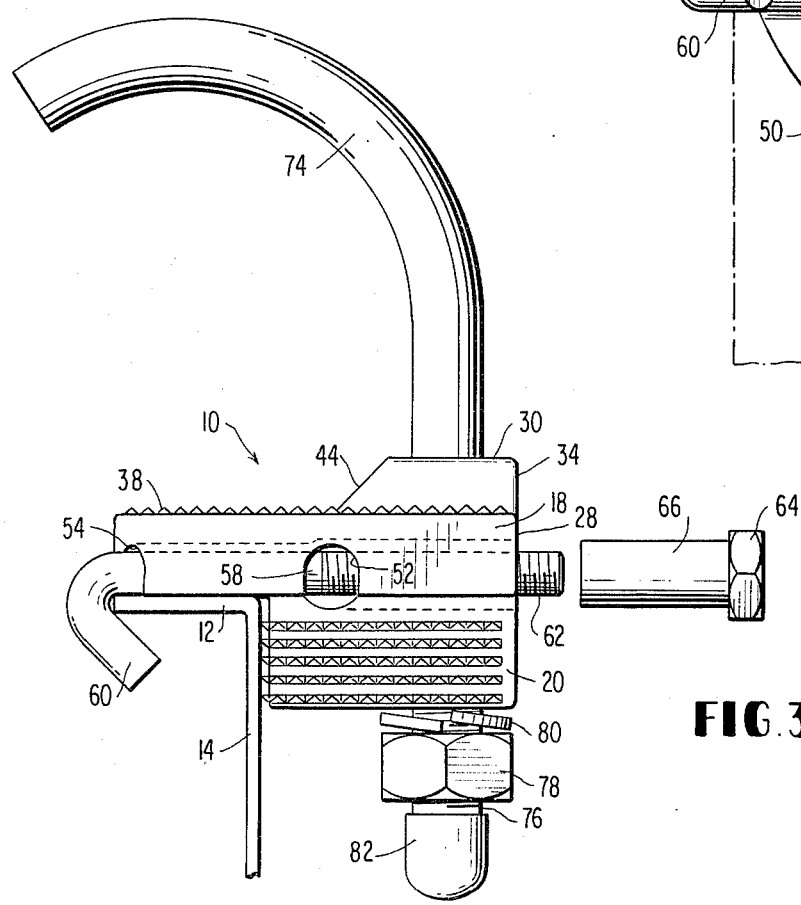

CABLE TRAY CONDUIT CLAMP

BACKGROUND OF THE INVENTION

1. Field of the Invention

The present invention is directed to a conduit clamp and more specifically to a clamp adapted to be secured to a flanged cable tray and adapted to secure a conduit to the clamp at any desired angle relative to the longitudinal direction of the cable tray.

2. Prior Art

The U.S. Pat. No. 1,840,216 (1932), to Tormo, discloses a conduit support having two parallel plates which may be secured to a beam flange which is disposed between the two plates by means of set screws extending through one of said plates. A strap type conduit clamp means which completely encircles the conduit is secured to the support by fastening means which extends through the ends of the strap which extend outwardly from the periphery of the conduit.

The U.S. Pat. No. 1,877,781 (1932), to Akerlund, discloses a conduit hanger which is adapted to be secured to a beam flange and is comprised of three separate clamping jaws having aligned apertures through which a common bolt extends. The two outer most clamping jaws are freely rotatable on the bolt and the intermediate jaw is disposed in threaded engagement with the bolt. The intermediate jaw is so designed that it cooperates with both of the outer jaws to produce two clamps, one of which serves to secure the hanger to the flange of an I-beam, for example, whereas the other engages and holds a conduit or the like.

The U.S. Pat. No. 1,888,342 (1932), to Anderson, is directed to a conduit hanger having a C-shaped body with a bolt threaded on an arm for clamping the body to the flange of an I-beam or the like. The other leg of the C-clamp has a post extending outwardly therefrom upon which the clamping member is freely movable whereby one or more conduits may be secured between the clamp member and the C-shaped body upon tightening a nut threaded on the end of the post.

The U.S. Pat. No. 3,228,639 (1966), to Korns, is directed to a pipe clamp having two clamping plates with aligned apertured bosses through which a bolt extends with a clamping nut threaded on the opposite end thereof. One of the plates is provided with angular notches for gripping the flange of an I-beam or the like and the other plate is provided with a V-shaped notch for holding a pipe or the like to the opposite surface of the flange when the nut and bolt draws the flanges together.

The U.S. Pat. No. 3,604,676 (1971), to Weber, is directed to a grounding and clamping device comprised of a combination conduit receiving and locking member and a flange clamp to rigidly secure and ground a metallic electrical conduit to a supporting metallic structure. A pair of adjustably coupled recessed members provide a conduit receiving cavity therebetween within which the conduit may be secured. The recessed members may be tightened about the conduit placed within the cavity by threadably engaging nuts on extensions protruding from one recessed member and extending through apertures in the other. Coupled to and extending from one of the recessed members is a flange clamp adapted to rigidly secure the recessed members to a support member. At each end of the flanges - adapted recessed member is a locking means threadably coupled thereto and extending into the clamp aperture to provide biting engagement between the recessed members and the support member.

In addition to the foregoing references, the following patents were cited during the prosecution of applicant's copending application Ser. No. 840,432 filed Oct. 7, 1977, entitled "Cable Tray Conduit Clamps":

| | |
|---|---|
| 768,819 - Palmer | 2,376,041 - Ellerthorpe |
| 988,927 - Great Britain | 2,726,836 - Dickson |
| 1,039,646 - Great Britain | 2,875,969 - Thompson |
| 1,199,326 - Weil | 2,901,199 - Thompson |
| 1,737,214 - Brown | 3,572,623 - Lapp |
| 2,282,310 - Dunn | |

The cable tray conduit clamp which is the subject of the above-identified copending application is suitable primarily for use with a U-shaped cable tray having outwardly directed flanges on the side walls.

SUMMARY OF THE INVENTION

The present invention provides a cable tray conduit clamp which is primarily suitable for use with a U-shaped cable tray having inwardly directed flanges on the side walls.

The present invention provides a cable tray conduit clamp having a strong, durable, one-piece body having means for securing the body to a U-shaped cable tray having inwardly directed flanges on the side walls. The clamp is provided with a swivel rod having a J-shaped hook end which can swivel so that the conduit can be securely clamped to the body at any desired angle independently of the connection of the body to the supporting flange.

The present invention provides a cable tray conduit clamp which is compact and light-weight while providing a maximum degree of flexibility for securing the conduit to a cable tray.

The present invention provides a cable tray conduit clamp having a one-piece body comprising a 90° sector plate having a square block protruding from one surface thereof with two sides of the block being in alignment with the radially disposed edges of said plate and a bevelled boss protruding from the other surface thereof with two sides thereof disposed in alignment with the radial edges of said plate. A pair of perpendicular intersecting bores are formed through the body which extend outwardly to the curved periphery of said sector plate as open channels in said one surface of said plate. A J-shaped bolt extends through and is adjustably secured in one of said bores by means of a sleeved nut for adjustably clamping the body to a cable tray conduit flange. A third bore extends through said block, plate and boss orthogonally relative to said intersecting bores and a J-shaped bolt is adjustably secured therein by means of a nut for clamping various size conduits to said other surface of said plate against the bevelled surface of said boss at varying angles relative to the longitudinal axis of the cable tray.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a perspective view showing the cable tray conduit clamp according to the present invention clamped to an inside flange of a cable tray with a conduit (shown in dotted lines) clamped thereon.

FIG. 2 is a bottom plan view of the cable tray conduit clamp shown in FIG. 1.

FIG. 3 is a side elevation view of the cable tray conduit clamp shown in FIG. 1.

DETAILED DESCRIPTION OF THE INVENTION

The cable tray conduit clamp 10 shown in FIG. 1 is shown attached to the inside flange 12 of a cable tray 14. Most conventional cable trays consist of a substantially U-shaped frame work with the side walls of the cable tray having either inwardly turned flanges or outwardly turned flanges. The cable tray conduit clamp which is the subject of applicant's copending application Ser. No. 840,432, filed Oct. 7, 1977 is primarily suitable for use with cable trays having outwardly directed flanges on the side walls. The cable tray conduit clamp according to the present invention is primarily suitable for use with cable trays having inwardly directed flanges on the side walls. A conduit 16 is shown in phantom lines in the clamped position on the upper surface of the clamp 10 in substantially parallel relationship to the longitudinal axis of the cable tray 14. As will be explained in greater detail hereinafter, the clamp 10 allows such a conduit 16 to be disposed at an entry angle relative to the cable tray anywhere within 180°.

The cable tray conduit clamp 10 according to the present invention includes a one-piece body comprising a 90° sector plate 18 having a substantially square block 20 protruding from one surface thereof with two side walls 22 and 24 of the block being in alignment with the radially extending side walls 26 and 28 of the sector plate 18. A boss 30 protrudes from the other surface of the sector plate 18 with the side walls 32 and 34 being in alignment with the side walls 26 and 28 of the sector plate. Thus, the block 20 and the boss 30 will be located one above the other on opposite sides of the sector plate 18 in the corner of the sector plate defined by the two radially extending sides. As best shown in FIG. 2, the corner 36 has been rounded off to eliminate a sharp edge and to reduce the weight of the clamp.

The upper surface of the sector plate 18 is provided with a plurality of pyramids 38 to provide a rough or knurled surface to assist in clamping a conduit thereon. Likewise, the surfaces 40 and 42 of the block 20 are knurled to assist in gripping the wall of the cable tray 14. The boss 30 is provided with a curved bevelled surface 44 against which the conduit will rest when clamped in position on the upper surface of the sector plate 18.

A pair of perpendicular intersecting bores 46 and 48 extend through the block 20 and extend to the curved periphery 50 of the sector plate 18 as open grooves 52 and 54 in the bottom surface of the sector plate 18. In the example illustrated, a bolt 58 is provided with a threaded end 62 and a reversely bent end 60 to define a J-shaped bolt. The threaded end of the bolt 58 is placed in the groove 54 and bore 48 with the bent end 60 hooked over the flange 12 of the cable tray 14. A nut 64 having a threaded sleeve 66 is secured to the threaded end 62 of the bolt 58 to draw the hooked end portion 60 into tight engagement with the flange 12 and the knurled surface 40 of the block 20 into tight engagement with the outside surface of the cable tray wall 14 thereby securely fastening the conduit clamp 10 to the cable tray.

A bore 70 extends through the boss 30, the sector plate 18 and the block 20 orthogonally with respect to the bores 46 and 48. A rod 72 having a first end 74 formed as a J-shaped hook is rotatably mounted in the bore 70 in the body of the clamp 10. The opposite end 76 of the rod 72 has a locknut 78 threaded thereon with a washer 80 disposed between the locknut and the lower surface of the block 20. The threaded portion of the rod 72 which protrudes beyond the locknut 78 may be covered with a plastic cap 82 as shown in FIGS. 2 and 3. The J-shaped hook portion 74 is formed so that the internal radius which grips the conduit 16 is slightly smaller than the conduit radius. This keeps the hook at right angles to the conduit and also allows the spring characteristics of the steel rod which forms the J-shaped hook 74 to provide a uniform grip on the conduit as the locknut 78 is tightened. Additionally, the smaller radius allows the J-shaped hook 74 to compensate for variations in the diameters of the conduit. It will accomodate rigid conduit, intermediate metal conduit and electrical metallic tubing of a given trade size. Other rods having slightly differently shaped hook portions may be substituted for the rod 72 to accomodate conduits of different diameters.

As illustrated in FIGS. 1–3, the bolt 58 extends through the bore 48 and the channel 54 to secure the clamp to the cable tray in the orientation as shown. With the clamp oriented in this manner relative to the cable tray, the conduit can be disposed in the position as shown in dotted lines parallel to the axis of the cable tray. The conduit 16 can be turned about the axis of the rod 72 to any intermediate location between the 0° position as illustrated and a 90° position wherein the conduit would be perpendicular to the cable tray. By removing the bolt 58 from the aperture in which it is illustrated and placing bolt 58 through the aperture 46 and channel 52 the clamp could be secured to the cable tray in a position rotated 90° from the position as illustrated. In such an orientation, the side 28 of the 90° sector plate would then be disposed perpendicular to the axis of the cable tray 14. With the clamp thus oriented, the conduit could be disposed at any angle between 90 and 180° relative to the axis of the cable tray. Thus, the entry angle for the conduit relative to the cable tray can be varied anywhere between 0 and 180° by using the clamp according to the present invention.

Various modifications may be made with respect to the clamp construction as shown both in design and materials. While it is preferable to use a malleable iron body which is galvanized with zinc, other metals could be used depending upon the nature of use. Variations in the exact shape of the body may also be made without affecting operability of the clamp.

While the invention has been particularly shown and described with reference to a preferred embodiment thereof, it will be understood by those in the art that the foregoing and other changes in form and detail may be made therein without departing from the spirit and scope of the invention.

What is claimed is:

1. A conduit clamp for securing a conduit at any desired angle relative to a U-shaped cable tray having a flange on each side thereof comprising a flat plate having an upper surface for supporting a conduit and a lower surface adapted to rest on a flange of said cable tray, a rectilinear block protruding downwardly from said bottom surface adapted to engage a side of said cable tray, two intersecting bores extending through said plate perpendicular to each other and parallel to said surfaces of said plate, a bolt extending through one of said bores having a J-shaped hook portion at one end thereof adapted to engage said flange and a nut threaded on the other end thereof engaging said clamp for securing said clamp to said cable tray, a further bore extending through said plate and block orthogonally relative to said intersecting bores and clamping means adjustably secured in said bore adapted to engage and clamp a conduit onto said upper surface of said plate.

2. A conduit clamp as set forth in claim 1, further comprising a boss protruding from the upper surface of said plate on the opposite side of said plate from said block, said boss being provided with a bevelled surface adapted to engage a conduit, said further bore also extending through said boss.

3. A conduit clamp as set forth in claim 1, wherein said plate is shaped as a 90° sector and said rectilinear block is disposed with two sides thereof in alignment with the radially extending sides of said plate, the other two sides of said block and the upper surface of said plate being provided with a knurled surface to assist in securing said clamp to said cable tray and to assist in securing a conduit to the upper surface of said plate, respectively.

4. A conduit clamp as set forth in claim 1, wherein said clamping means is comprised of a rod having a nut adjustably threaded on one end thereof below said block with the opposite end of the rod being curved for gripping a conduit to the upper surface of said plate.

5. A conduit clamp as set forth in claim 1 wherein said plate extends outwardly beyond at least two adjacent surfaces of said block which extend perpendicular to said plate with said intersecting bores disposed perpendicular to the planes of said two adjacent surfaces of said block respectively.

6. A conduit clamp as set forth in claim 1 wherein said intersecting bores intersect the lower surface of said plate to define two open grooves in the lower surface of said plate which are extensions of said intersecting bores for guiding said hook portion of said bolt, said bolt being readily interchangeable from one of said intersecting bores to the other to change the orientation of said clamp relative to said cable tray by 90°.

* * * * *